United States Patent
Zhang et al.

(10) Patent No.: US 10,412,549 B2
(45) Date of Patent: Sep. 10, 2019

(54) ORIENTATION METHOD, DEVICE, AND SYSTEM

(71) Applicant: Huawei Technologies Co., Ltd., Shenzhen (CN)

(72) Inventors: Xiaoping Zhang, Shenzhen (CN); Yajun Zhang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 57 days.

(21) Appl. No.: 15/529,461

(22) PCT Filed: Nov. 25, 2014

(86) PCT No.: PCT/CN2014/092115
§ 371 (c)(1),
(2) Date: May 24, 2017

(87) PCT Pub. No.: WO2016/082091
PCT Pub. Date: Jun. 2, 2016

(65) Prior Publication Data
US 2017/0332201 A1 Nov. 16, 2017

(51) Int. Cl.
*H04W 4/02* (2018.01)
*H04L 5/14* (2006.01)
(Continued)

(52) U.S. Cl.
CPC ............ *H04W 4/026* (2013.01); *G01S 3/043* (2013.01); *G01S 3/40* (2013.01); *H04L 5/1438* (2013.01);
(Continued)

(58) Field of Classification Search
CPC ..... H04W 4/023; H04W 4/026; H04W 4/029; G01S 3/00–50; G01S 3/74; G01S 5/0284–12; G01S 13/06–46
(Continued)

(56) References Cited

U.S. PATENT DOCUMENTS 6,208,297 B1 * 3/2001 Fattouche ............. G01S 5/0009
342/450
8,760,347 B1 * 6/2014 Lu ............................ G01S 5/14
342/417
(Continued)

FOREIGN PATENT DOCUMENTS

CN 101363910 A 2/2009
CN 103517407 1/2014
(Continued)

*Primary Examiner* — Edward F Urban
*Assistant Examiner* — Rui M Hu
(74) *Attorney, Agent, or Firm* — Leydig, Voit & Mayer, Ltd.

(57) ABSTRACT

A method includes: determining a reference direction for orientation; when a first device rotates around an obstruction, receiving a wireless signal sent by a second device, and obtaining a link quality parameter value according to the received wireless signal; determining a position having greatest shadow fading of the first device according to the obtained link quality parameter value, and using a pointing direction of the position having greatest shadow fading of the first device as a first pointing direction; and determining, according to an included angle $\theta_1$ between the reference direction and the first pointing direction and an included angle $\theta_2$ between the reference direction and a second pointing direction, a direction in which the second device is located, where the second pointing direction is a pointing direction of the first device.

20 Claims, 8 Drawing Sheets

(51) Int. Cl.
*H04W 48/04* (2009.01)
*G01S 3/04* (2006.01)
*G01S 3/40* (2006.01)
*G01S 5/02* (2010.01)
*H04W 64/00* (2009.01)

(52) U.S. Cl.
CPC .............. *H04W 48/04* (2013.01); *G01S 5/02* (2013.01); *H04W 64/006* (2013.01)

(58) Field of Classification Search
USPC .................... 455/404.2, 456.1–457
See application file for complete search history.

(56) References Cited

U.S. PATENT DOCUMENTS

| | | | |
|---|---|---|---|
| 9,730,049 B1* | 8/2017 | Malik | H04W 4/80 |
| 2005/0007251 A1* | 1/2005 | Crabtree | G01S 3/54 |
| | | | 340/539.13 |
| 2005/0267677 A1* | 12/2005 | Poykko | G01S 5/0252 |
| | | | 701/408 |
| 2006/0052112 A1* | 3/2006 | Baussi | G01S 3/143 |
| | | | 455/456.1 |
| 2007/0197229 A1 | 8/2007 | Kalliola et al. | |
| 2008/0224917 A1* | 9/2008 | Kim | G01S 13/02 |
| | | | 342/146 |
| 2009/0058729 A1* | 3/2009 | Jo | G01S 5/021 |
| | | | 342/387 |
| 2011/0210959 A1* | 9/2011 | Howard | G01S 5/12 |
| | | | 345/418 |
| 2012/0313820 A1* | 12/2012 | Tyree | G01S 5/0252 |
| | | | 342/450 |
| 2012/0321092 A1 | 12/2012 | Fischer | |
| 2013/0002489 A1* | 1/2013 | Erad | G01S 3/20 |
| | | | 342/432 |
| 2013/0079027 A1* | 3/2013 | Hand | H04W 24/00 |
| | | | 455/456.1 |
| 2013/0188538 A1* | 7/2013 | Kainulainen | G01S 3/48 |
| | | | 370/310 |
| 2013/0317944 A1* | 11/2013 | Huang | G01S 5/0252 |
| | | | 705/26.61 |
| 2014/0104443 A1* | 4/2014 | Takahashi | H04N 1/00347 |
| | | | 348/207.1 |
| 2015/0334527 A1* | 11/2015 | Chang | G01S 3/20 |
| | | | 455/456.1 |
| 2015/0358784 A1* | 12/2015 | Liao | H04W 4/04 |
| | | | 455/456.1 |
| 2016/0021511 A1* | 1/2016 | Jin | H04W 4/04 |
| | | | 455/457 |
| 2016/0157284 A1* | 6/2016 | Kim | H04W 76/10 |
| | | | 370/329 |
| 2016/0183116 A1* | 6/2016 | Zhang | G01C 21/08 |
| | | | 455/456.1 |
| 2017/0332201 A1 | 11/2017 | Zhang et al. | |
| 2017/0343355 A1* | 11/2017 | Tengfjord | G01C 21/165 |
| 2017/0374499 A1* | 12/2017 | Yonezawa | H04B 17/27 |

FOREIGN PATENT DOCUMENTS

| | | |
|---|---|---|
| CN | 103605110 A | 2/2014 |
| CN | 106664575 | 5/2017 |

* cited by examiner

ORIENTATION METHOD, DEVICE, AND SYSTEM

CROSS-REFERENCE TO RELATED APPLICATIONS

This application is a National Stage of International Application No. PCT/CN2014/092115, filed Nov. 25, 2014, which is hereby incorporated by reference in its entirety.

TECHNICAL FIELD

The present invention relates to the field of communications technologies, and in particular, to an orientation method, device, and system.

BACKGROUND

Rapid development of a mobile terminal and a wearable device brings various convenience to people's life. In daily life, when leaving home, a user may forget to carry an article of the user such as a key, a mobile phone, or a wallet; or when a user takes a child or a pet to go shopping, the child or the pet gets lost; or a user may accidentally lose some valuables when the user is out for business. Therefore, searching for a lost article is an extremely common demand in daily life.

In the prior art, there is a product that performs positioning based on a global positioning system (English full name: Global Positioning System, GPS for short). Because an error exists in GPS positioning, only an approximate location of a second device can be provided roughly, which increases searching difficulty of the user. In addition, a GPS positioning function cannot be used indoors, and cannot implement high-precision positioning indoors. Moreover, there is also a wireless tag (or a wearable device such as a smart band or a smart watch) with an anti-lost/retrieving function. In general, a mobile terminal and a wireless tag (or a wearable device) are kept connected by means of a wireless connection. Besides conventional communication, an anti-lost/retrieving function is further designed. A received signal strength indicator (English full name: Received Signal Strength Indication, RSSI for short) threshold is set in the mobile terminal, and when wireless signal strength is less than the preset threshold or the wireless connection is disconnected, the mobile terminal reminds the user to search in time in a manner of ringing, vibrating, or the like. In terms of device retrieving, when the mobile terminal and the wireless tag (or the wearable device) are kept wirelessly connected, searching may be performed by means of a sound after the mobile terminal triggers the wireless tag (or the wearable device) to sound; or when the wireless signal strength is less than the preset threshold or the wireless connection is disconnected, the wireless tag (or the wearable device) may sound automatically, so that the user can search by means of a sound. However, it is difficult to quickly and accurately determine a position by means of an auditory sensation of a human ear; searching and listening need to be performed at the same time, have low efficiency, and are extremely likely to be affected by ambient noise, a time limit, or an obstruction; and the user is not likely to perceive that the wireless tag (or the wearable device) is lost.

SUMMARY

A technical problem to be resolved by embodiments of the present invention is to provide an orientation method, device, and system, so as to resolve inaccurate orientation and low efficiency of searching for a second device.

A first aspect provides an orientation method, including:
determining a reference direction for orientation;
when a first device rotates around an obstruction, receiving a wireless signal sent by a second device, and obtaining a link quality parameter value according to the received wireless signal;
determining a position having greatest shadow fading of the first device according to the obtained link quality parameter value, and using a pointing direction of the position having greatest shadow fading of the first device as a first pointing direction; and determining, according to an included angle $\theta_1$ between the reference direction and the first pointing direction and an included angle $\theta_2$ between the reference direction and a second pointing direction, a direction in which the second device is located, where the second pointing direction is a pointing direction of the first device.

In a first possible implementation manner of the first aspect, the determining a reference direction for orientation includes:
determining the reference direction for orientation by using a geomagnetic sensor; or
using an initial pointing direction of the first device when an orientation function is enabled as the reference direction for orientation; or
receiving a selection instruction of a user, and using a direction set by the user as the reference direction according to the selection instruction.

With reference to the first aspect or the first possible implementation manner of the first aspect, in a second possible implementation manner, the determining link quality parameter value of a position having greatest shadow fading of the first device according to the obtained link quality parameter value includes:
filtering the obtained link quality parameter value; and
determining, as the position having greatest shadow fading of the first device, a pointing direction that is of the first device and corresponding to a smallest filtered link quality parameter value.

With reference to any one of the first aspect, or the first to the second possible implementation manners of the first aspect, in a third possible implementation manner, the determining, according to an included angle $\theta_1$ between the reference direction and the first pointing direction and an included angle $\theta_2$ between the reference direction and a second pointing direction, a direction in which the second device is located, where the second pointing direction is a pointing direction of the first device includes:
measuring the included angle $\theta_1$ between the reference direction and the first pointing direction, and measuring the included angle $\theta_2$ between the reference direction and the second pointing direction; and
using a clockwise rotation direction as a forward direction, obtaining an included angle $\theta$ between the second pointing direction and the first pointing direction after subtracting the included angle $\theta_2$ between the reference direction and the second pointing direction from the included angle $\theta_1$ between the reference direction and the first pointing direction, using the second pointing direction as an initial location, and determining $\theta$ plus 180° as the direction in which the second device is located, where the second pointing direction is a pointing direction of the first device.

With reference to any one of the first aspect, or the first to the third possible implementation manners of the first aspect, in a fourth possible implementation manner, after the determining a direction in which the second device is located, the method further includes:

displaying, on a display of the first device in a form of a text or an image, information about the direction in which the second device is located; or broadcasting, in a form of a voice, the direction in which the second device is located; or sending information about the direction in which the second device is located to a third device, so that the third device displays or broadcasts the information about the direction in which the second device is located.

With reference to any one of the first aspect, or the first to the fourth possible implementation manners of the first aspect, in a fifth possible implementation manner, before the determining a reference direction for orientation, further includes:

wirelessly connecting to the second device, and keeping the orientation function in a normally open state.

A second aspect provides a first device, including:

a first determining unit, configured to determine a reference direction for orientation;

a receiving unit, configured to: when the first device rotates around an obstruction, receive a wireless signal sent by a second device;

an obtaining unit, configured to obtain a link quality parameter value according to the wireless signal received by the receiving unit;

a second determining unit, configured to determine a position having greatest shadow fading of the first device according to the link quality parameter value obtained by the obtaining unit, and use a pointing direction of the position having greatest shadow fading of the first device as a first pointing direction; and a third determining unit, configured to determine, according to an included angle $\theta_1$ between the reference direction and the first pointing direction and an included angle $\theta_2$ between the reference direction and a second pointing direction, a direction in which the second device is located, where the second pointing direction is a pointing direction of the first device.

In a first possible implementation manner of the second aspect, the first determining unit is specifically configured to:

determine the reference direction for orientation by using a geomagnetic sensor; or use an initial pointing direction of the first device when an orientation function is enabled as the reference direction for orientation; or receive a selection instruction of a user, and use a direction set by the user as the reference direction according to the selection instruction.

With reference to the second aspect or the first possible implementation manner of the second aspect, in a second possible implementation manner, the second determining unit is specifically configured to:

filter the link quality parameter value; and determine, as the position having greatest shadow fading of the first device, a pointing direction that is of the first device and corresponding to a smallest filtered link quality parameter value.

With reference to any one of the second aspect, or the first to the second possible implementation manners of the second aspect, in a third possible implementation manner, the third determining unit is specifically configured to:

measure the included angle $\theta_1$ between the reference direction and the first pointing direction, and measure the included angle $\theta_2$ between the reference direction and the second pointing direction; and use a clockwise rotation direction as a forward direction, obtain an included angle $\theta$ between the second pointing direction and the first pointing direction after subtracting the included angle $\theta_2$ between the reference direction and the second pointing direction from the included angle $\theta_1$ between the reference direction and the first pointing direction, use the second pointing direction as an initial location, and determine $\theta$ plus 180° as the direction in which the second device is located.

With reference to any one of the second aspect, or the first to the third possible implementation manners of the second aspect, in a fourth possible implementation manner, the first device further includes:

a display unit, configured to display, on a display of the first device in a form of a text or an image, information about the direction in which the second device is located; or broadcast, in a form of a voice, the direction in which the second device is located; or send information about the direction in which the second device is located to another device, so that the another device displays or broadcasts the information about the direction in which the second device is located.

With reference to any one of the second aspect, or the first to the fourth possible implementation manners of the second aspect, in a fifth possible implementation manner, further includes:

an orientation unit, where the orientation unit is configured to wirelessly connect to the second device, and keep the orientation function in a normally open state.

A third aspect provides a first device, including:

an input apparatus, an output apparatus, a memory, a processor, and a bus, where the input apparatus, the output apparatus, the memory, and the processor are connected to the bus, where the input apparatus is configured to receive input data or an input instruction that is input from the outside into the first device;

the output apparatus is configured to output output data of the first device; and the memory is configured to store a program, and the processor is configured to invoke the program to execute the following operations:

determining a reference direction for orientation;

when the first device rotates around an obstruction, receiving a wireless signal sent by a second device, and obtaining a link quality parameter value;

determining a position having greatest shadow fading of the first device according to the link quality parameter value, and using a pointing direction of the position having greatest shadow fading of the first device as a first pointing direction; and determining, according to an included angle $\theta_1$ between the reference direction and the first pointing direction and an included angle $\theta_2$ between the reference direction and a second pointing direction, a direction in which the second device is located, where the second pointing direction is a pointing direction of the first device.

In a first possible implementation manner of the third aspect, the determining, by the processor, a reference direction for orientation includes:

determining the reference direction for orientation by using a geomagnetic sensor; or using an initial pointing direction of the first device when an orientation function is enabled as the reference direction for orientation; or receiving a selection instruction of a user, and using a direction set by the user as the reference direction according to the selection instruction.

With reference to the third aspect or the first possible implementation manner of the third aspect, in a second possible implementation manner, the determining, by the processor, link quality parameter value of a position having greatest shadow fading of the first device according to the obtained link quality parameter value includes:

filtering the link quality parameter value; and determining, as the position having greatest shadow fading of the first device, a pointing direction that is of the first device and corresponding to a smallest filtered link quality parameter value.

With reference to any one of the third aspect, or the first to the second possible implementation manners of the third aspect, in a third possible implementation manner, the determining, by the processor according to an included angle $\theta_1$ between the reference direction and the first pointing direction and an included angle $\theta_2$ between the reference direction and a second pointing direction, a direction in which the second device is located includes:

measuring the included angle $\theta_1$ between the reference direction and the first pointing direction, and measuring the included angle $\theta_2$ between the reference direction and the second pointing direction; and using a clockwise rotation direction as a forward direction, obtaining an included angle $\theta$ between the second pointing direction and the first pointing direction after subtracting the included angle $\theta_2$ between the reference direction and the second pointing direction from the included angle $\theta_1$ between the reference direction and the first pointing direction, using the second pointing direction as an initial location, and determining $\theta$ plus 180° as the direction in which the second device is located.

With reference to any one of the third aspect, or the first to the third possible implementation manners of the third aspect, in a fourth possible implementation manner, the processor is further configured to display, by using the output apparatus after determining the direction in which the second device is located, the direction in which the second device is located.

With reference to any one of the third aspect, or the first to the fourth possible implementation manners of the third aspect, in a fifth possible implementation manner, the processor is further configured to wirelessly connect to the second device by using the input apparatus, and keep the orientation function in a normally open state.

A fourth aspect provides an orientation system, which may include:

the first device according to the second aspect, or the third aspect, or any possible implementation manner of the second aspect, or any possible implementation manner of the third aspect; and a second device, configured to send a wireless signal to the first device.

A first pointing direction is determined by using a shadow fading effect, and a direction in which a second device is located may be obtained by using an included angle between a reference direction and the first pointing direction and an included angle between the reference direction and a current second pointing direction of the first device. The solution has an accurate result and high searching efficiency, and is not likely to be affected by ambient noise or an obstruction, thereby implementing quick orientation and helping a user to retrieve a lost article.

BRIEF DESCRIPTION OF DRAWINGS

To describe the technical solutions in the embodiments of the present invention or in the prior art more clearly, the following briefly introduces the accompanying drawings required for describing the embodiments or the prior art. Obviously, the following described drawings are merely some embodiments of the present invention.

DESCRIPTION OF EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention.

It should be noted that in this specification, the related "first", "second", and "third" are merely for ease of differentiation, have no other meanings, and constitute no limitation.

Figure 1:
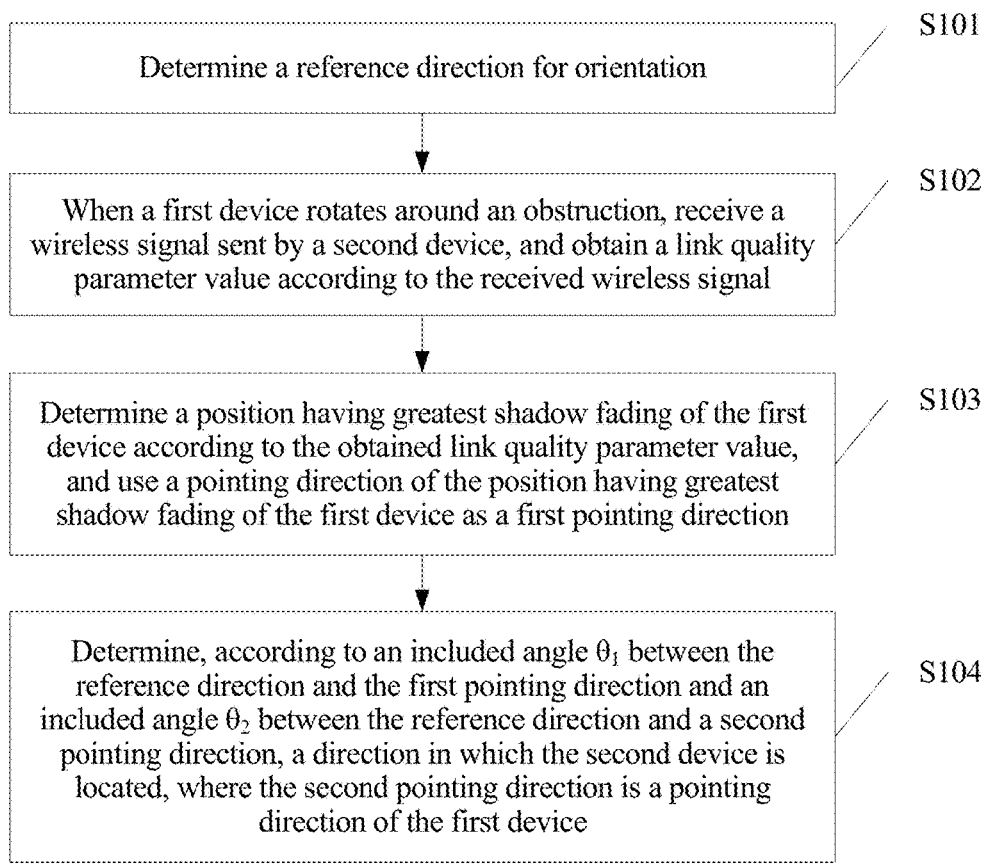
FIG. 1 is a schematic flowchart of a first embodiment of an orientation method according to the present invention.

Referring to FIG. 1, FIG. 1 is a schematic flowchart of a first embodiment of an orientation method according to the present invention. It should be noted that this embodiment is executed by a first device. In this embodiment, the method includes the following steps:

S101. Determine a reference direction for orientation.

Optionally, the first device may determine the reference direction according to a hardware configuration of the first device. For example, when a geomagnetic sensor is configured in the first device, the reference direction may be determined based on a geomagnetic effect. For instance, a south magnetic pole or north magnetic pole direction of the geomagnetic field may be selected as the reference direction for orientation. Certainly, the east or the west determined by the geomagnetic sensor may also be selected as the reference direction. A principle of the geomagnetic sensor is similar to that of a compass, and is not repeatedly described herein. Alternatively, when a gyro sensor is configured in the first device, an initial pointing direction of the first device when an orientation function is enabled may be used as the reference direction for orientation. Certainly, after the orientation function is enabled, a user may also select a pointing direction of the first device at a time point as the reference direction, and the first device uses the direction set by the user as the reference direction after receiving a selection instruction of the user.

It should be noted that the pointing direction of the first device is a direction pre-defined for the first device when the user normally uses the first device. The direction may be a pointing direction of a top of the first device, or may be a pointing direction of a bottom or a left side or a right side of the first device, or certainly may be a pointing direction of a part between the top or the bottom of the first device and the left side or the right side of the first device, or may be any pointing direction of the first device such as a vertical pointing direction. In addition, both the pointing direction and an angle in the embodiments of the present invention are a pointing direction and an angle of a projection of the first device in a horizontal plane. No limit is set herein. In daily life, to meet a device use habit of the user, the pointing direction of the top of the first device may generally be used as the pointing direction of the first device. For example, when the first device is a mobile phone, when the user holds the mobile phone, a pointing direction of a top of the mobile phone is used as a pointing direction of the mobile phone; or when the first device is a wearable device (such as a smart band or a smart watch), when the user correctly wears the wearable device, a pointing direction of a top of the wearable device is used as a pointing direction of the wearable device. Optionally, the first device may keep monitoring signal strength of a wireless connection with a second device, and trigger a reminding mechanism according to a signal strength change to enable the user to learn whether the second device is lost, so that the user may choose to input an orientation function trigger instruction to enable the first device to enable the orientation function and begin to search for the second device. Certainly, according to a signal strength change, the first device may also perform reminding and automatically enable the orientation function immediately; or a switch for automatically enabling the orientation function may be set in the first device. The user makes a suitable choice according to a scenario requirement.

It should be noted that the first device mentioned in this specification includes but is not limited to a smartphone, a tablet, or another mobile terminal.

The second device mentioned in this specification includes but is not limited to a children watch, a smart watch, a smart band, a wireless tag, or the like.

S102. When the first device rotates around an obstruction, receive a wireless signal sent by a second device, and obtain a link quality parameter value according to the received wireless signal.

Optionally, the link quality parameter value may be an RSSI, a link quality indication (English full name: Link Quality Indicator, LQI for short), a symbol error rate (English full name: Symbol Error Rate, SER for short), or another parameter value that may represent strength of a received signal.

It should be noted that, to ensure an accurate result of a shadow fading effect, a distance herein between the first device and the obstruction is relatively short in general, such as 10 centimeters or 20 centimeters. The obstruction may be a user body, or may be another object. The user may hold the first device or fasten the first device to the another object, provided that the first device is blocked in a direction.

S103. Determine a position having greatest shadow fading of the first device according to the obtained link quality parameter value, and use a pointing direction of the position having greatest shadow fading of the first device as a first pointing direction.

In a propagation process of the wireless signal, when the wireless signal encounters the obstruction, a shadow fading effect is generated in a direction opposite to a signal source. In particular, shadow fading is relatively great in a specific area that is extremely close to the obstruction. Therefore, if the user holds the first device and rotates 360° at a same place, theoretically, when the first device rotates to a pointing direction opposite to a direction in which the second device is located, greatest shadow fading is generated due to blocking by the user body. In this case, strength of the wireless signal received by the first device is the weakest. The strength of the wireless signal may be explicitly represented by the link quality parameter value. However, affected by a complex channel environment, received signal strength generally fluctuates, and sometimes fluctuates irregularly. Therefore, the link quality parameter value needs to be filtered so as to eliminate interference. The link quality parameter value is processed by using a filtering algorithm or a related algorithm, so that a position having greatest attenuation of received signal strength on the whole is determined, and the position is used as a position opposite to that of the second device. Specifically, a link quality parameter value obtained in a current position may be first filtered to enable the link quality parameter value to become smooth; then a filtered link quality parameter value obtained in the current position (for example, a first link quality parameter value) is separately compared with a filtered link quality parameter value obtained in at least one previous position (for example, a second link quality parameter value) and a filtered link quality parameter value obtained in at least one subsequent position (for example, a third link quality parameter value). If the first link quality parameter value is less than the second link quality parameter value and the third link quality parameter value is greater than the first link quality parameter value, the current position is the position having greatest shadow fading. Theoretically, when the first device rotates around the obstruction, receives the wireless signal sent by the second device, obtains the link quality parameter value according to the received wireless signal, and then determines the position having greatest shadow fading of the first device according to the obtained link quality parameter value, all link quality parameter values when the first device rotates 360° around the obstruction need to be obtained, so that a smallest value of the link quality parameter values can be obtained by comparison and then the position having greatest shadow fading can be determined. However, by using the comparison method in this embodiment, a comparison range may be narrowed, because only when a filtered link quality parameter value obtained in the position having greatest shadow fading is less than both a filtered link quality parameter value obtained in a previous position and a filtered link quality parameter value obtained in a next position, another location cannot meet this condition. During comparison, the filtered link quality parameter value obtained in the current position may be compared only with a filtered link quality parameter value obtained in a previous position and a filtered link quality parameter value obtained in a next position separately, so as to reduce a quantity of times of comparison, reduce device power consumption, and increase orientation efficiency. Link quality parameter values obtained in any quality of positions may also be selected for comparison.

When more values are selected for comparison, correctness of a conclusion can be improved, and a comparison result deviation caused by another factor such as electromagnetic interference may be avoided. During comparison, comparison may first be performed with a strength parameter obtained in a previous position that is closest to the current position in terms of a time point, and then comparison is performed with a strength parameter obtained in a position prior to the previous position. Comparison with a strength parameter obtained in a next position is similar, and is not repeatedly described herein.

S104. Determine, according to an included angle $\theta_1$ between the reference direction and the first pointing direction and an included angle $\theta_2$ between the reference direction and a second pointing direction, a direction in which the second device is located.

The second pointing direction is a pointing direction of the first device. When the user holds the first device to perform searching, because of a fixed relationship existing between the first pointing direction and the direction in which the second device is located, the direction in which the second device is located may be determined according to the included angle $\theta_1$ between the reference direction and the first pointing direction and the included angle $\theta_2$ between the reference direction and the current second pointing direction of the first device. In addition, the direction in which the second device is located is displayed on a display of the first device in a form of a pattern or a character, which is beneficial for the user to intuitively learn the direction in which the second device is located and efficiently perform searching.

It should be noted that in this embodiment, the wireless signal may be a Wireless Fidelity (English full name: Wireless-Fidelity, Wi-Fi for short) signal, a ZigBee (Zigbee) signal, or a Bluetooth signal, or certainly may be another wireless signal, which is not limited herein. In addition, when the position having greatest shadow fading is being determined, $\theta_2$ needs to be not less than $\theta_1$.

When supported by hardware, a role of the first device and a role of the second device may be exchanged in this embodiment. For example, a mobile phone and a smart watch are kept wirelessly connected. If an angle measurement module (such as a geomagnetic sensor or a gyro sensor or another sensor) is configured in a unit for orientation in the mobile phone, the mobile phone may enable an orientation function to search for a direction in which the smart watch is located. Likewise, if an angle measurement module (such as a geomagnetic sensor or a gyro sensor) is configured in the smart watch, the smart watch may enable an orientation function to search for a direction in which the mobile phone is located. After the direction is determined, angle information may be displayed on a display of the mobile phone or a display of the smart watch in a form of a text or a graph such as an arrow, or angle information obtained by calculation may be broadcast in a form of a voice by using a speaker of the mobile phone or the smart watch. No limit is set herein. In another similar scenario, such as a wireless connection between a mobile phone and a children watch or a wireless connection between a mobile phone and a wireless tag, when supported by hardware, mutual orientation and searching between the first device and the second device may also be implemented, and a direction may be indicated by using a corresponding reminding form such as a voice, a text, or an image.

Optionally, before step S101, the first device may be wirelessly connected to the second device, and keep the orientation function in a normally open state. In this way, after the first device and the second device are connected, the first device determines in real time the direction in which the second device is located, and notifies the user in a form of a text or an image or a voice.

A first pointing direction is determined by using a shadow fading effect, and a direction in which a second device is located may be obtained by using an included angle between a reference direction and the first pointing direction and an included angle between the reference direction and a pointing direction of a first device (a second pointing direction). The solution has an accurate result and high searching efficiency, and is not likely to be affected by ambient noise or an obstruction, thereby implementing quick orientation, helping a user to retrieve a lost article, and avoiding property loss. The solution is particularly applicable to accurate indoor orientation, costs little, is easy to implement, and is beneficial to large batch production and application.

Figure 2:
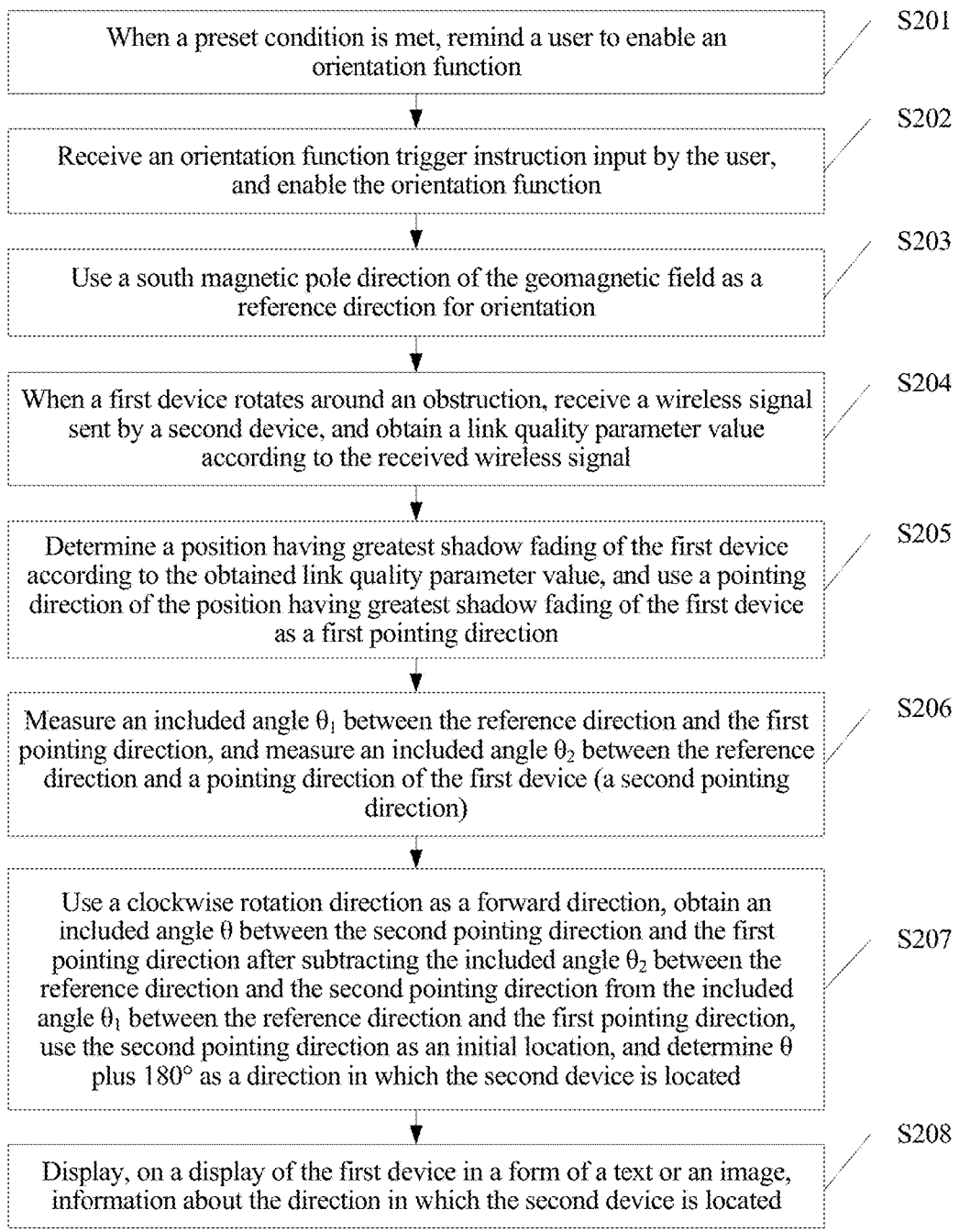
FIG. 2 is a schematic flowchart of a second embodiment of an orientation method according to the present invention.
Figure 3:
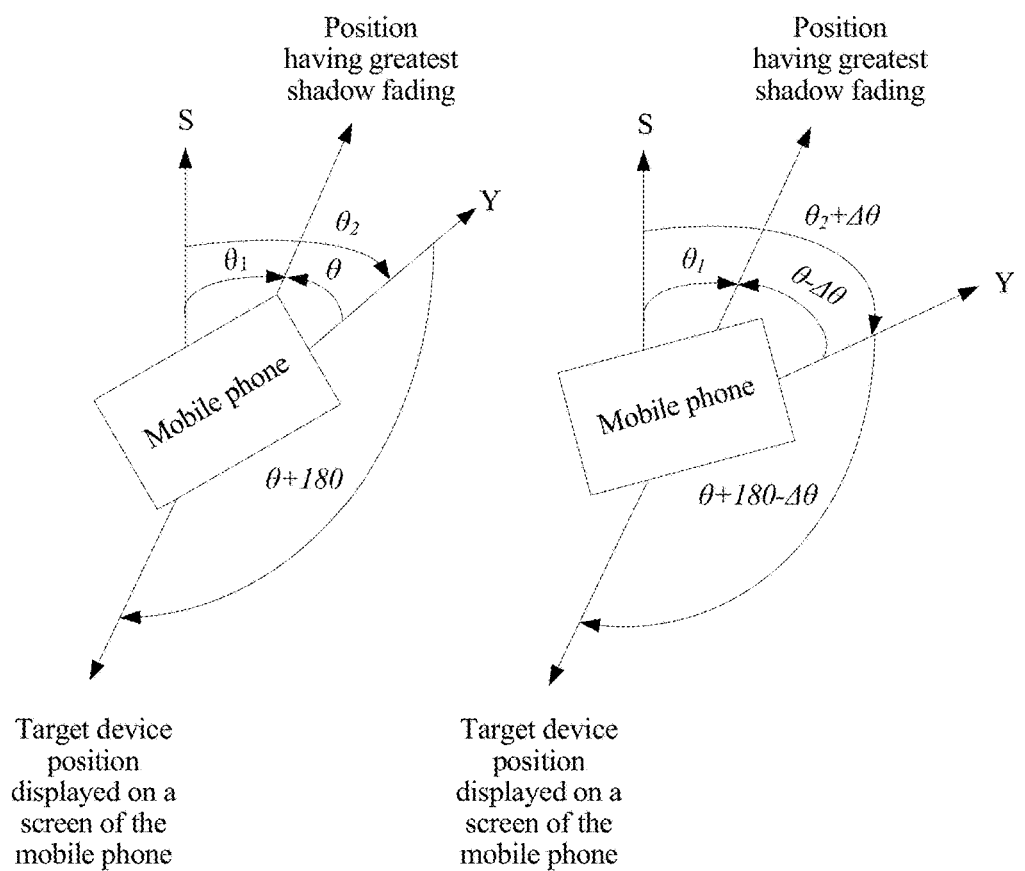
FIG. 3 is a schematic diagram of angle calculation when the orientation method of FIG. 2 is used to search for a second device.

Referring to FIG. 2 and FIG. 3, FIG. 2 is a schematic flowchart of a second embodiment of an orientation method according to the present invention, and FIG. 3 is a schematic diagram of angle calculation when the orientation method of FIG. 2 is used to search for a second device. It should be noted that this embodiment is executed by a first device. In this embodiment, the method includes the following steps:

S201. When a preset condition is met, remind a user to enable an orientation function.

Optionally, the preset condition includes any one of the following:

A wireless connection between the first device and the second device changes from a connected state to a disconnected state. In this case, the second device may enter a connectable orientation broadcast state, and increase transmit power if possible, and the first device performs orientation by receiving an orientation broadcast signal.

A strength parameter value of the signal of the second device received by the first device is equal to a first threshold. In this case, the first device and the second device may simultaneously increase a communication power level, extend a wireless connection distance, and ensure that the first device and the second device are kept in a wireless connection state. The first device performs orientation by receiving a wireless signal. A signal strength parameter herein may be an RSSI, an LQI, an SER, or another parameter that may indicate signal strength.

The strength parameter value of the signal of the second device received by the first device is less than or equal to a second threshold, where the first threshold is a minimum value of a signal strength parameter value for the first device and the second device to be kept wirelessly connected, and the second threshold is greater than the first threshold.

The user may configure a reminding function according to a need of the user. For example, reminding may be configured to be performed at a moment when the wireless connection between the first device and the second device is disconnected, reminding may be configured to be performed at a moment when the wireless connection between the first device and the second device is to be disconnected but not disconnected, or reminding may be configured to be performed when a signal strength parameter value of the wireless connection between the first device and the second device is less than or equal to a threshold. A reminding manner may also be configured flexibly. For example, a manner is used such as flashing of a display of the first device, dipole vibration, or broadcasting a preset audio file by a speaker. Specifically, the reminding manner may be configured according to an environment in which the user is located. The first device implements reminding in different reminding manners by receiving a configuration instruction input by the user.

S202. Receive an orientation function trigger instruction input by the user, and enable the orientation function.

S203. Use a south magnetic pole direction of the geomagnetic field as a reference direction for orientation.

Optionally, a north magnetic pole direction of the geomagnetic field may also be used as the reference direction for orientation; or an initial pointing direction of the first device when the orientation function is enabled is used as the reference direction for orientation; or a direction set by the user is used as the reference direction after a selection instruction of the user is received.

S204. When the first device rotates around an obstruction, receive a wireless signal sent by the second device, and obtain a link quality parameter value according to the received wireless signal.

S205. Determine a position having greatest shadow fading of the first device according to the obtained link quality parameter value, and use a pointing direction of the position having greatest shadow fading of the first device as a first pointing direction.

Optionally, the link quality parameter value may be first filtered, so that interference is filtered out, and an obtained result is smoother.

Then, by comparison, a pointing direction that is of the first device and corresponding to a smallest filtered link quality parameter value is determined as the position having greatest shadow fading of the first device. For a specific method, refer to related description of S103. Details repeatedly described herein.

S206. Measure an included angle $\theta_1$ between the reference direction and the first pointing direction, and measure an included angle $\theta_2$ between the reference direction and a pointing direction of the first device (a second pointing direction).

S207. Use a clockwise rotation direction as a forward direction, obtain an included angle $\theta$ between the second pointing direction and the first pointing direction after subtracting the included angle $\theta_2$ between the reference direction and the second pointing direction from the included angle $\theta_1$ between the reference direction and the first pointing direction, use the second pointing direction as an initial location, and determine $\theta$ plus 180° as a direction in which the second device is located.

Figure 5:
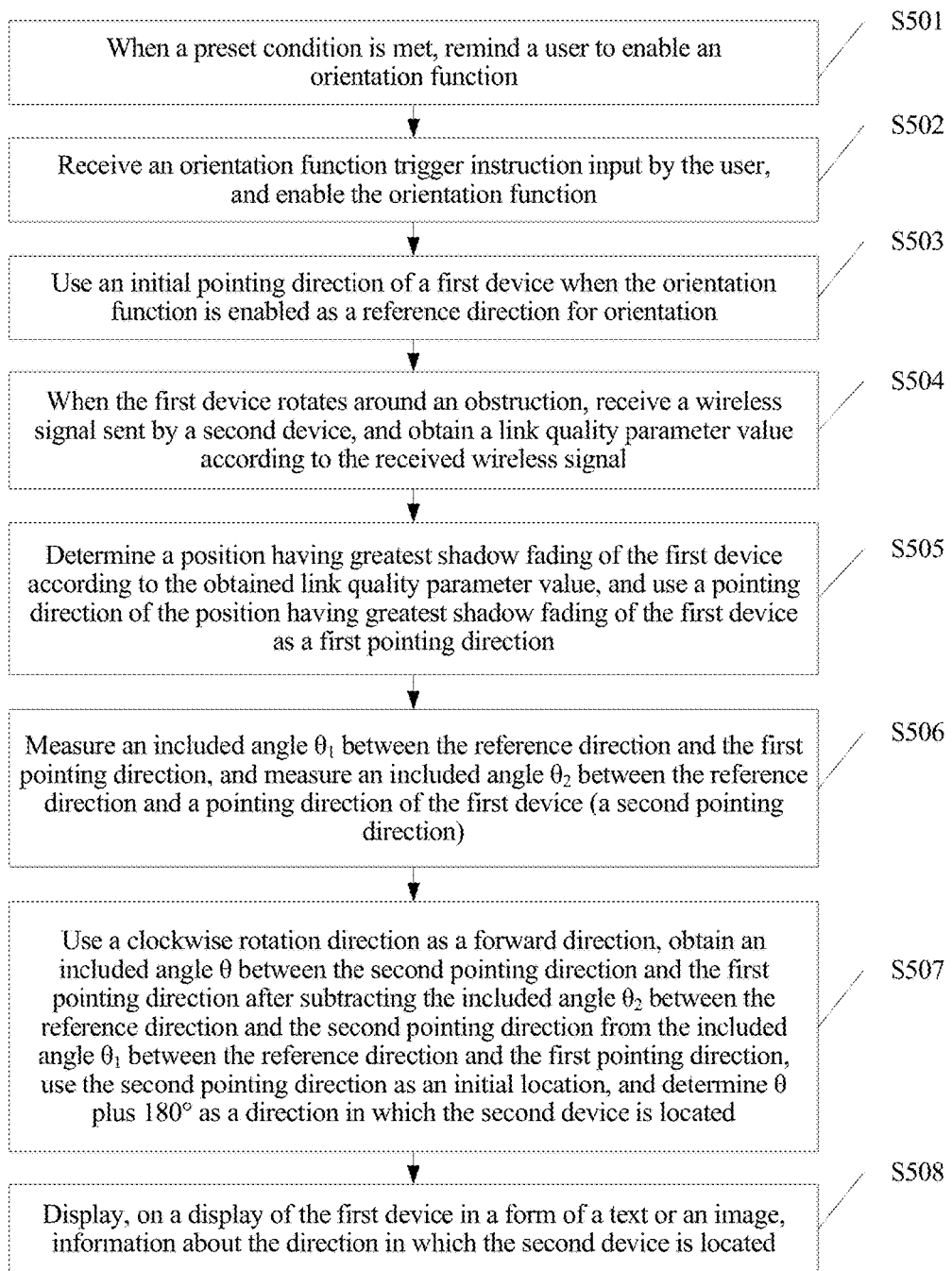
FIG. 5 is a schematic flowchart of a third embodiment of an orientation method according to the present invention.

For details, refer to FIG. 3. As shown in the figure, currently, the first device is a mobile phone. The south magnetic pole direction of the geomagnetic field is used as the reference direction, that is, an S axis. In a rotation process of the mobile phone, a position having greatest shadow fading is determined. An included angle between the S axis and the position is $\theta_1$, and an included angle between the S axis and a pointing direction of the mobile phone (a second pointing direction), that is a Y axis shown in the figure, is $\theta_2$. An included angle $\theta$ between the second pointing direction and the first pointing direction is obtained after $\theta_2$ is subtracted from $\theta_1$. Then, the Y axis is used as an initial location, and $\theta$ plus 180° is determined as a direction in which a second device is located. For example, if the included angle $\theta_1$ between the S axis and the first pointing direction is 30° and the included angle $\theta_2$ between the S axis and the second pointing direction (the Y axis) is 60°, the included angle $\theta$ between the second pointing direction and the first pointing direction is 30°−60°=−30°. Therefore, if the Y axis is used as the initial location, the direction in which the second device is located is −30°+180°=150°, so that a direction of 150° based on the Y axis may be indicated on a display of the mobile phone. Certainly, an anti-clockwise rotation direction may also be used as the forward direction. A calculation principle and a calculation process are similar, and are not repeatedly described herein. In a searching process, if the first device rotates $\Delta\theta$, the included angle between the reference direction and the second pointing direction changes to $(\theta_2+\Delta\theta)$. In this case, the direction in which the second device is located is $(\theta_1-\theta_2+180)-\Delta\theta$, that is, $\theta+180-\Delta\theta$. Therefore, in the searching process of the user, as shown in FIG. 5, the user has to zigzag due to a circuitous road, which causes the pointing direction of the first device to change constantly. However, a direction displayed on the display of the first device also changes constantly according to the pointing direction of the first device and always points to the second device.

S208. Display, on a display of the first device in a form of a text or an image, information about the direction in which the second device is located.

Optionally, a displaying manner may be displaying the direction in which the second device is located in a form of a text, may be displaying in a form of a flashing point, or may be displaying in a form of an arrow, so as to implement a relatively intuitive pointing function. Alternatively, the direction in which the second device is located may also be broadcast in a form of a voice; or the information about the direction in which the second device is located may be sent to a third device, so that the third device displays or broadcasts the information about the direction in which the second device is located.

It should be noted that in this embodiment, to perform orientation by using the south magnetic pole direction of the geomagnetic field as the reference direction, a geomagnetic sensor needs to be configured in the first device.

Figure 4:
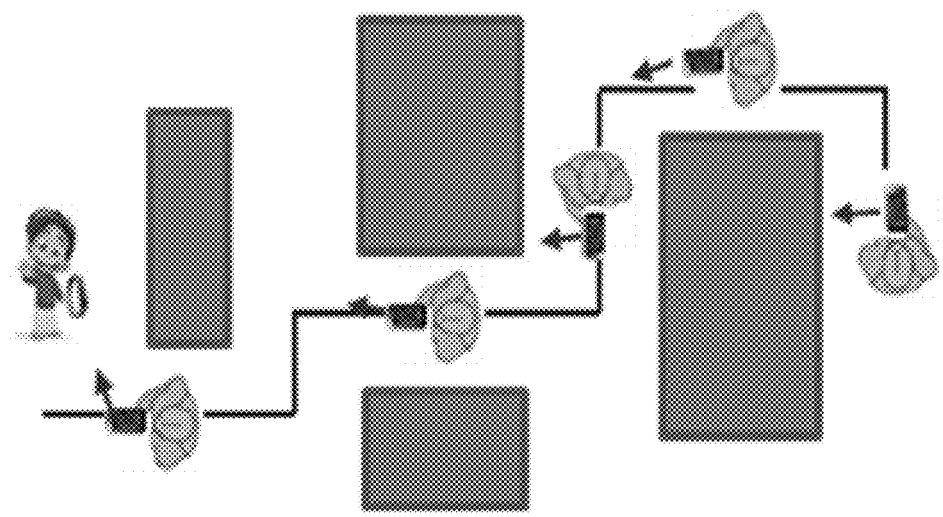
FIG. 4 is a schematic diagram of angle calculation when the orientation method of FIG. 2 is used to search for a second device and a pointing direction of a first device is changed.

Referring to FIG. 4, FIG. 4 is a schematic diagram of a change of a pointing direction of a first device when the orientation method of FIG. 2 is used to search for a second device.

Based on the angle calculation principle shown in FIG. 3, in a searching process of a user, as shown in FIG. 4, the user has to zigzag due to a circuitous road, which causes the pointing direction of the first device to change constantly. However, a direction displayed on a display of the first device also changes constantly according to the pointing direction of the first device and always points to the second device.

An entire process may be divided into an orientation phase and a searching phase. In the orientation phase, the first device begins to rotate from an initial location with the user, and the first device simultaneously measures a rotation angle from a reference direction to a current pointing direction, records an RSSI, and determines, in real time by calculation, whether a current position is a position having greatest shadow fading. When a position is determined as the position having greatest shadow fading, a current rotation angle is locked as a first pointing direction. At this time, the mobile phone stops executing a process of determining the position having greatest shadow fading, and begins to enter the searching phase.

In the searching phase, an arrow on a display screen of the first device needs to always point to the second device. In this case, the first device first measures the rotation angle from the reference direction to the current pointing direction, that is, a second pointing direction, then determines an angle that is of the arrow displayed on the display screen of the first device and relative to the first device according to the first pointing direction and the second pointing direction, and finally searches for the second device according to an indication of the arrow.

Figure 6:
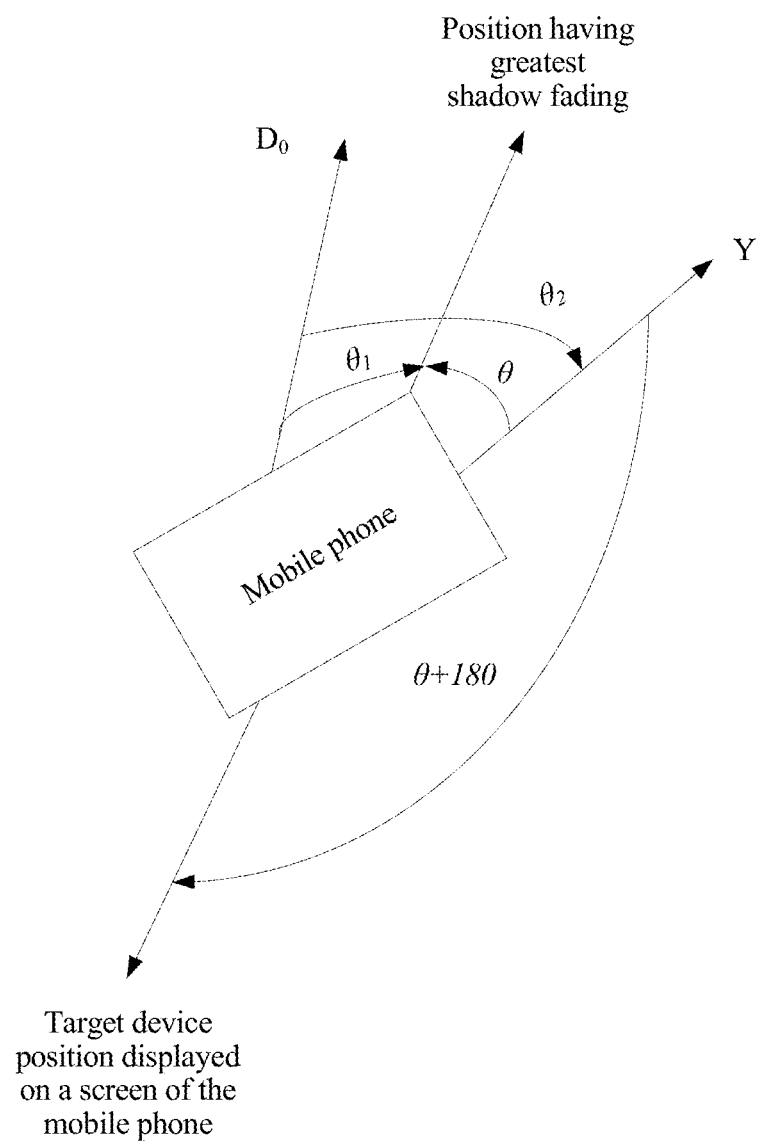
FIG. 6 is a schematic diagram of angle calculation when the orientation method of FIG. 5 is used to search for a second device.

Referring to FIG. 5 and FIG. 6, FIG. 5 is a schematic flowchart of a third embodiment of an orientation method according to the present invention, and FIG. 6 is a schematic diagram of angle calculation when the orientation method of FIG. 5 is used to search for a second device. It should be noted that this embodiment is executed by a first device. In this embodiment, the method includes the following steps:

S501. When a preset condition is met, remind a user to enable an orientation function.

The preset condition includes any one of the following:

a wireless connection between the first device and the second device changes from a connected state to a disconnected state;

a link quality parameter value of a signal of the second device received by the first device is equal to a first threshold; or a link quality parameter value of a signal of the second device received by the first device is less than or equal to a second threshold.

The first threshold is a minimum value of a link quality parameter value for the first device and the second device to be kept wirelessly connected, and the second threshold is greater than the first threshold.

S502. Receive an orientation function trigger instruction input by the user, and enable the orientation function.

S503. Use an initial pointing direction of the first device when the orientation function is enabled as a reference direction for orientation.

S504. When the first device rotates around an obstruction, receive a wireless signal sent by the second device, and obtain a link quality parameter value according to the received wireless signal.

S505. Determine a position having greatest shadow fading of the first device according to the obtained link quality parameter value, and use a pointing direction of the position having greatest shadow fading of the first device as a first pointing direction.

S506. Measure an included angle $\theta_1$ between the reference direction and the first pointing direction, and measure an included angle $\theta_2$ between the reference direction and a pointing direction of the first device (a second pointing direction).

S507. Use a clockwise rotation direction as a forward direction, obtain an included angle $\theta$ between the second pointing direction and the first pointing direction after subtracting the included angle $\theta_2$ between the reference direction and the second pointing direction from the included angle $\theta_1$ between the reference direction and the first pointing direction, use the second pointing direction as an initial location, and determine $\theta$ plus 180° as a direction in which the second device is located.

S508. Display, on a display of the first device in a form of a text or an image, the direction in which the second device is located.

As shown in FIG. 6, an initial pointing direction of a mobile phone when the orientation function is enabled, that is, a $D_0$ axis, is used as a reference direction for orientation, an included angle between the $D_0$ axis and a position having greatest shadow fading, that is, an included angle between the $D_0$ axis to a first pointing direction is $\theta_1$, and an included angle between the $D_0$ axis and a current pointing direction of the mobile phone (a second pointing direction), that is, a Y axis, is $\theta_2$. Therefore, $\theta_1$-$\theta_2$ is an included angle $\theta$ between the second pointing direction and the first pointing direction. Finally, the Y axis is used as an initial location, and $\theta$+180 is a direction in which a second device is located. When the mobile phone further rotates $\Delta\theta$, direction calculation of the second device is similar to that in the embodiment shown in FIG. 3, and is not repeatedly described herein.

It should be noted that in this embodiment, direction determining needs a support of a gyro sensor. An error may exist in direction determining based on a geomagnetic sensor or a gyro sensor. Therefore, the orientation methods in the embodiment shown in FIG. 2 and in the embodiment shown in FIG. 5 may be combined. Whether results obtained by using the two different methods are accurate are determined according to an angle change when the first device rotates, so as to correct the results. Specifically, during correction, if a result is determined to be inaccurate because a geomagnetic sensor is affected by electromagnetism of a surrounding device, the result obtained by the geomagnetic sensor may be corrected according to a result obtained by a gyro sensor; or an average value of angle values obtained by using the two methods is directly calculated; or summation calculation is performed after different weights are assigned, according to sensor precision in a specific environment, to angle values obtained by using the two methods; or a result obtained by using one of the two methods may be directly discarded when being determined to have a relatively great error, which is not limited herein.

Figure 7:
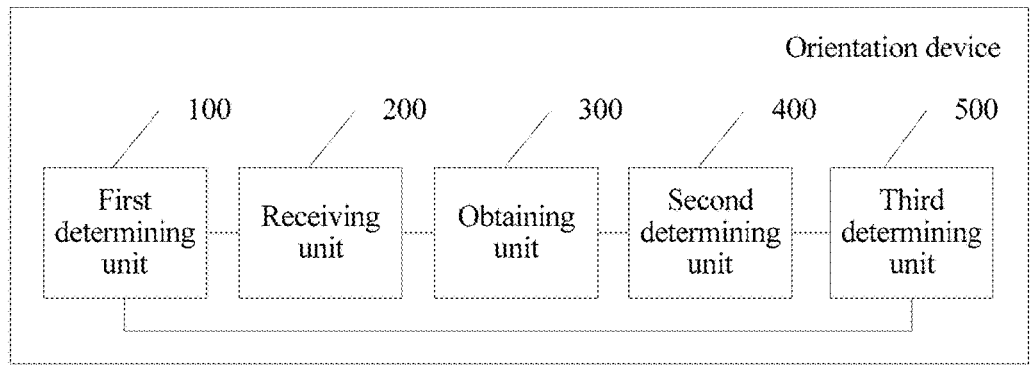
FIG. 7 is a schematic flowchart of a first embodiment of a first device according to the present invention.

Referring to FIG. 7, FIG. 7 is a schematic composition diagram of a first embodiment of a first device according to the present invention. In this embodiment, the first device includes:

a first determining unit 100, configured to determine a reference direction for orientation;

a receiving unit 200, configured to: when the first device rotates around an obstruction, receive a wireless signal sent by a second device;

an obtaining unit 300, configured to obtain a link quality parameter value according to the wireless signal received by the receiving unit 200;

a second determining unit 400, configured to determine a position having greatest shadow fading of the first device according to the link quality parameter value obtained by the obtaining unit 300, and use a pointing direction of the position having greatest shadow fading of the first device as a first pointing direction; and a third determining unit 500, configured to determine, according to an included angle $\theta_1$ between the reference direction and the first pointing direction and an included angle $\theta_2$ between the reference direction and a second pointing direction, a direction in which the second device is located, where the second pointing direction is a pointing direction of the first device.

Optionally, the first determining unit 100 is specifically configured to:

determine the reference direction for orientation by using a geomagnetic sensor; or use an initial pointing direction of the first device when an orientation function is enabled as the reference direction for orientation; or receive a selection instruction of a user, and use a direction set by the user as the reference direction according to the selection instruction.

Optionally, the second determining unit 400 is specifically configured to:

filter the link quality parameter value; and determine, as the position having greatest shadow fading of the first device, a pointing direction that is of the first device and corresponding to a smallest filtered link quality parameter value.

In hardware constitution, the second determining unit 400 may include a filter module and a comparison module. The two modules may be disposed individually according to a logical function, or may be disposed in an integrated manner, which is not limited herein.

The third determining unit 500 is specifically configured to:

measure the included angle $\theta_1$ between the reference direction and the first pointing direction, and measure the included angle $\theta_2$ between the reference direction and the second pointing direction; and use a clockwise rotation direction as a forward direction, obtain an included angle $\theta$ between the second pointing direction and the first pointing direction after subtracting the included angle $\theta_2$ between the reference direction and the second pointing direction from the included angle $\theta_1$ between the reference direction and the first pointing direction, use the second pointing direction as an initial location, and determine $\theta$ plus 180° as the direction in which the second device is located. The third determining unit 400 may include an angle measurement module and an angle calculation module. The two modules may be disposed individually according to a logical function, or may be disposed in an integrated manner, which is not limited herein.

Figure 8:
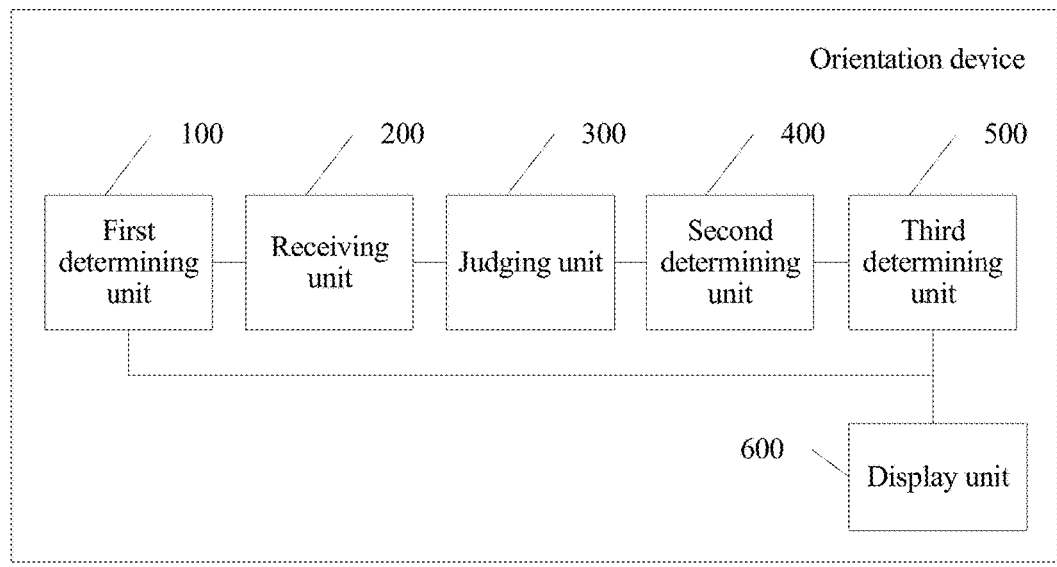
FIG. 8 is a schematic composition diagram of a second embodiment of a first device according to the present invention.

In another feasible implementation manner, referring to FIG. 8, FIG. 8 is a schematic composition diagram of a second embodiment of a first device according to the present invention. In this embodiment, compared with the first device shown in FIG., the first device in this embodiment further includes:

a display unit 600, configured to display, on a display of the first device in a form of a text or an image, information about the direction in which the second device is located; or broadcast, in a form of a voice, the direction in which the second device is located; or send information about the direction in which the second device is located to another device, so that the another device displays or broadcasts the information about the direction in which the second device is located.

Optionally, a reminding unit may further be configured, which is configured to: when a preset condition is met, remind the user to enable the orientation function.

The preset condition may include any one of the following:

a wireless connection between the first device and the second device changes from a connected state to a disconnected state;

a link quality parameter value of a signal of the second device received by the first device is equal to a first threshold; or a link quality parameter value of a signal of the second device received by the first device is less than or equal to a second threshold.

The first threshold is a minimum value of a link quality parameter value in which the first device and the second device are kept wirelessly connected, and the second threshold is greater than the first threshold.

It should be noted that the foregoing first determining unit, obtaining unit, second determining unit, third determining unit, and display unit may exist individually, or may be disposed in an integrated manner. In the embodiment of the first device, the first determining unit, the second determining unit, or the third determining unit may be independent of a processor of the first device in a form of hardware and be disposed individually, and may be disposed in a form of a microprocessor; or may be built in a processor of the first device in a form of hardware; or may be stored into a memory of the first device in a form of software, so that a processor of the first device invokes and executes an operation corresponding to the foregoing first determining unit, second determining unit, or third determining unit.

For example, in the first embodiment of the first device according to the present invention (the embodiment shown in FIG. 7), the second determining unit 300 may be the processor of the first device; functions of the first determining unit 100 and the third determining unit 400 may be embedded into the processor, or may be independent of the processor and be disposed individually, or may be stored into the memory in a software form, so that the processor invokes and implements the functions of the first determining unit 100 and the third determining unit 400. The embodiment of the present invention sets no limitation. The foregoing processor may be a central processing unit (CPU), a microprocessor, a single-chip microcomputer, or the like.

Figure 9:
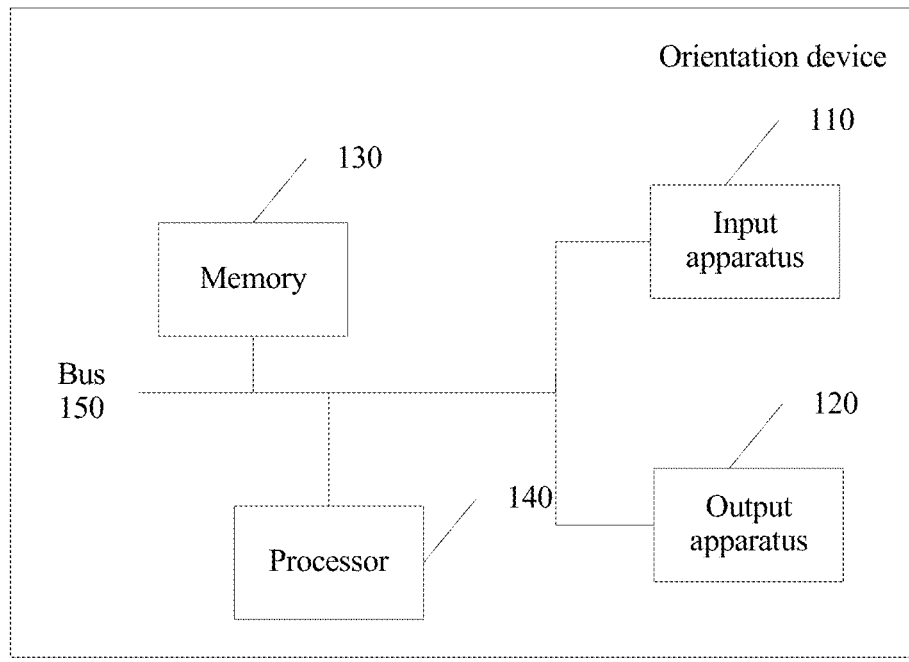
FIG. 9 is a schematic composition diagram of a third embodiment of a first device according to the present invention.

Referring to FIG. 9, FIG. 9 is a schematic composition diagram of a third embodiment of a first device according to the present invention. In this embodiment, the first device includes an input apparatus 110, an output apparatus 120, a memory 130, a processor 140, and a bus 150. The input apparatus 110, the output apparatus 120, the memory 130, and the processor 140 are connected to the bus 150.

The input apparatus 110 is configured to receive input data or an input instruction that is input from the outside into the first device.

The output apparatus 120 is configured to output output data of the first device.

The memory 130 is configured to store a program, and the processor 140 is configured to invoke the program to execute the following operations:

determining a reference direction for orientation;

when the first device rotates around an obstruction, receiving a wireless signal sent by a second device, and obtaining a link quality parameter value;

determining a position having greatest shadow fading of the first device according to the link quality parameter value, and using a pointing direction of the position having greatest shadow fading of the first device as a first pointing direction; and determining, according to an included angle $\theta_1$ between the reference direction and the first pointing direction and an included angle $\theta_2$ between the reference direction and a second pointing direction, a direction in which the second device is located, where the second pointing direction is a pointing direction of the first device.

The processor 140 is specifically configured to:

determine the reference direction for orientation by using a geomagnetic sensor; or use an initial pointing direction of the first device when an orientation function is enabled as the reference direction for orientation; or receive a selection instruction of a user, and use a direction set by the user as the reference direction according to the selection instruction. The processor 140 is specifically configured to:

filter the link quality parameter value; and determine, as the position having greatest shadow fading of the first device, a pointing direction that is of the first device and corresponding to a smallest filtered link quality parameter value.

The processor 140 is specifically configured to:

measure the included angle $\theta_1$ between the reference direction and the first pointing direction, and measure the included angle $\theta_2$ between the reference direction and the second pointing direction; and use a clockwise rotation direction as a forward direction, obtain an included angle $\theta$ between the second pointing direction and the first pointing direction after subtracting the included angle $\theta_2$ between the reference direction and the second pointing direction from the included angle $\theta_1$ between the reference direction and the first pointing direction, use the second pointing direction as an initial location, and determine $\theta$ plus 180° as the direction in which the second device is located.

Optionally, the processor 140 is further configured to display, by using the output apparatus 120 after determining the direction in which the second device is located, the direction in which the second device is located. In this case, the output apparatus may be a display or a speaker.

The processor 140 is further configured to wirelessly connect to the second device by using the input apparatus 110, and keep the orientation function in a normally open state.

The processor 140 is further configured to:

when a preset condition is met, remind, by using the output apparatus 120, a user to enable the orientation function. In this case, the output apparatus 120 may be a display, a dipole, or a speaker.

The preset condition includes any one of the following:

a wireless connection between the first device and the second device changes from a connected state to a disconnected state;

a link quality parameter value of a signal of the second device received by the first device is equal to a first threshold; or a link quality parameter value of a signal of the second device received by the first device is less than or equal to a second threshold.

The first threshold is a minimum value of a link quality parameter value for the first device and the second device to be kept wirelessly connected, and the second threshold is greater than the first threshold.

Figure 10:
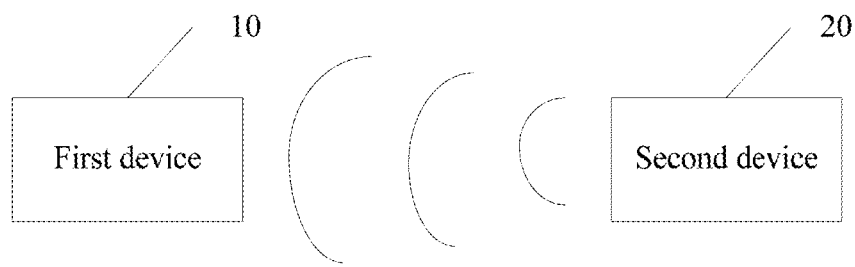
FIG. 10 is a schematic composition diagram of an orientation system according to an embodiment of the present invention.

Referring to FIG. 10, FIG. 10 is a schematic composition diagram of an orientation system according to an embodiment of the present invention. In this embodiment, the orientation system includes:

the first device 10 according to the embodiment of FIG. 7 or FIG. 8; and a second device 20, configured to send a wireless signal to the first device 10.

The embodiments in this specification are all described in a progressive manner, for same or similar parts in the embodiments, reference may be made to these embodiments, and each embodiment focuses on a difference from other embodiments. For the apparatus embodiment, because it is basically similar to the method embodiment, the apparatus embodiment is described briefly, and for the relevant part, reference may be made to the part of the description of the method embodiment.

According to the description of the foregoing embodiments, the present invention has the following advantages:

A first pointing direction is determined by using a shadow fading effect, and a direction in which a second device is located may be obtained by using an included angle between a reference direction and the first pointing direction and an included angle between the reference direction and a current second pointing direction of the first device. The solution has an accurate result and high searching efficiency, and is not likely to be affected by ambient noise or an obstruction, thereby implementing quick orientation, helping a user to retrieve a lost article, and avoiding property loss. The solution is particularly applicable to accurate indoor orientation, costs little, is easy to implement, and is beneficial to large batch production and application.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (English: Read-Only Memory, ROM for short), or a random access memory (English: Random Access Memory, RAM for short).

The foregoing disclosed descriptions are merely exemplary embodiments of the present invention, but are not intended to limit the scope of the claims of the present invention. Therefore, equivalent variations made according to the claims of the present invention shall fall within the scope of the present invention.

What is claimed is:

1. An orientation method comprising:
    determining a reference direction for orientation;
    when a first device rotates around an obstruction, receiving a wireless signal sent by a second device, and obtaining a link quality parameter value according to the received wireless signal;
    determining a position having greatest shadow fading of the first device according to the obtained link quality parameter value, and using a pointing direction of the position having the greatest shadow fading of the first device as a first pointing direction;
    determining a direction in which the second device is located by measuring (a) an included angle $\theta_1$ between the reference direction and the first pointing direction and (b) an included angle $\theta_2$ between the reference direction and a second pointing direction, wherein the second pointing direction is a pointing direction of the first device;
    using a clockwise rotation direction as a forward direction, obtaining an included angle $\theta$ between the first and second pointing directions after subtracting the included angle $\theta_2$ from the included angle $\theta_1$; and
    using the second pointing direction as an initial location, determining $\theta$ plus 180° as the direction in which the second device is located.

2. The orientation method according to claim 1, wherein determining the reference direction for orientation comprises determining the reference direction for orientation by using a geomagnetic sensor.

3. The orientation method according to claim 1, wherein determining the position having the greatest shadow fading of the first device according to the obtained link quality parameter value comprises:
    filtering the obtained link quality parameter value; and
    determining, as the position having the greatest shadow fading of the first device, the pointing direction that is of the first device and corresponding to a smallest filtered link quality parameter value.

4. The orientation method according to claim 1, wherein after determining the direction in which the second device is located, the method further comprises:

displaying, on a display of the first device in a form of a text or an image, information about the direction in which the second device is located.

5. The orientation method according to claim 1, wherein before determining the reference direction for orientation, the method further comprises:
wirelessly connecting to the second device, and keeping the orientation function in a normally open state.

6. The orientation method according to claim 1, wherein after the determining the direction in which the second device is located, the method further comprises:
broadcasting, in a form of a voice, the direction in which the second device is located.

7. The orientation method according to claim 1, wherein after the determining the direction in which the second device is located, the method further comprises:
sending information about the direction in which the second device is located to a third device, so that the third device displays or broadcasts the information about the direction in which the second device is located.

8. The orientation method according to claim 1, wherein determining the reference direction for orientation comprises using an initial pointing direction of the first device when an orientation function is enabled as the reference direction for orientation.

9. The orientation method according to claim 1, wherein determining the reference direction for orientation comprises receiving a selection instruction of a user, and using a direction set by the user as the reference direction according to the selection instruction.

10. A first device comprising an input apparatus, an output apparatus, a memory, a processor, and a bus, wherein the input apparatus, the output apparatus, the memory, and the processor are connected to the bus, wherein
the input apparatus is configured to receive input data or an input instruction that is input from outside into the first device;
the output apparatus is configured to output data of the first device; and
the memory is configured to store a program, and the processor is configured to invoke the program to execute the following operations:
determining a reference direction for orientation;
when the first device rotates around an obstruction, receiving a wireless signal sent by a second device, and obtaining a link quality parameter value;
determining a position having greatest shadow fading of the first device according to the link quality parameter value, and using a pointing direction of the position having the greatest shadow fading of the first device as a first pointing direction;
determining a direction in which the second device is located by measuring (a) an included angle $\theta_1$ between the reference direction and the first pointing direction and (b) an included angle $\theta_2$ between the reference direction and a second pointing direction, wherein the second pointing direction is a pointing direction of the first device;
using a clockwise rotation direction as a forward direction, obtaining an included angle $\theta$ between the first and second pointing directions after subtracting the included angle $\theta_2$ from the included angle $\theta_1$; and
using the second pointing direction as an initial location, determining $\theta$ plus 180° as the direction in which the second device is located.

11. The first device according to claim 10, wherein the operation of determining the reference direction for orientation comprises one of the following:
(a) determining the reference direction for orientation by using a geomagnetic sensor;
(b) using an initial pointing direction of the first device when an orientation function is enabled as the reference direction for orientation; and
(c) receiving a selection instruction of a user, and using a direction set by the user as the reference direction according to the selection instruction.

12. The first device according to claim 10, wherein the operation of determining the position having the greatest shadow fading of the first device comprises:
filtering the link quality parameter value; and
determining, as the position having the greatest shadow fading of the first device, the pointing direction that is of the first device and is associated with a smallest filtered link quality parameter value.

13. The first device according to claim 10, wherein the processor is further configured to display, by using the output apparatus after determining the direction in which the second device is located, the direction in which the second device is located.

14. The first device according to claim 10, wherein the processor is further configured to wirelessly connect to the second device by using the input apparatus, and keep the orientation function in a normally open state.

15. A non-transitory computer readable medium comprising computer readable instructions that, when executed by a computer processor, cause the computer processor to implement the following operations:
determining a reference direction for orientation;
when a first device rotates around an obstruction, receiving a wireless signal sent by a second device, and obtaining a link quality parameter value according to the received wireless signal;
determining a position having greatest shadow fading of the first device according to the obtained link quality parameter value, and using a pointing direction of the position having greatest shadow fading of the first device as a first pointing direction;
determining a direction in which the second device is located by measuring (a) an included angle $\theta_1$ between the reference direction and the first pointing direction and (b) an included angle $\theta_2$ between the reference direction and a second pointing direction, wherein the second pointing direction is a pointing direction of the first device;
using a clockwise rotation direction as a forward direction, obtaining an included angle $\theta$ between the first and second pointing directions after subtracting the included angle $\theta_2$ from the included angle $\theta_1$; and
using the second pointing direction as an initial location, determining $\theta$ plus 180° as the direction in which the second device is located.

16. The non-transitory computer readable medium according to claim 15, wherein the operation of determining the reference direction for orientation comprises one of the following:
(a) determining the reference direction for orientation by using a geomagnetic sensor;
(b) using an initial pointing direction of the first device when an orientation function is enabled as the reference direction for orientation; and (c) receiving a selection instruction of a user, and using a direction set by the user as the reference direction according to the selection instruction.

17. The non-transitory computer readable medium according to claim 15, wherein the operation of determining the position having the greatest shadow fading of the first device comprises:
   filtering the obtained link quality parameter value; and
   determining, as the position having the greatest shadow fading of the first device, the pointing direction that is of the first device and is associated with a smallest filtered link quality parameter value.

18. The non-transitory computer readable medium according to claim 15, wherein after determining the direction in which the second device is located, the operations further comprises one of the following:
   displaying, on a display of the first device in a form of a text or an image, information about the direction in which the second device is located; and
   broadcasting, in a form of a voice, the direction in which the second device is located.

19. The non-transitory computer readable medium according to claim 15, wherein before determining the reference direction for orientation, the operations further comprises:
   wirelessly connecting to the second device, and keeping the orientation function in a normally open state.

20. The non-transitory computer readable medium according to claim 15, wherein after determining the direction in which the second device is located, the operations further comprises:
   sending information about the direction in which the second device is located to a third device, so that the third device displays or broadcasts the information about the direction in which the second device is located.

* * * * *